United States Patent [19]
Stein

[11] Patent Number: 5,946,294
[45] Date of Patent: Aug. 31, 1999

[54] REDUNDANCY-OPTIMIZED COMMUNICATION NETWORK FOR THE TRANSMISSION OF COMMUNICATION SIGNALS

[75] Inventor: Karl-Ulrich Stein, Unterhaching, Germany

[73] Assignee: Siemens Aktiengesellschaft, Munich, Germany

[21] Appl. No.: 08/617,300

[22] Filed: Mar. 18, 1996

[30] Foreign Application Priority Data

Mar. 16, 1995 [DE] Germany ............................ 195 09 602
Mar. 27, 1995 [DE] Germany ............................ 195 11 250

[51] Int. Cl.$^6$ ................................................... H04L 1/22
[52] U.S. Cl. ........................................... 370/221; 370/228
[58] Field of Search ...................................... 370/395, 230, 370/235, 397, 399, 409, 396, 398, 406, 411, 221, 222, 223, 224, 225, 226, 218–220, 217, 216, 227, 228; 340/825.01, 827

[56] References Cited

U.S. PATENT DOCUMENTS 5,317,561   5/1994   Fischer et al. .
5,442,647   8/1995   Loebig ..................................... 370/217
5,457,678   10/1995  Goeldmer .
5,621,722   4/1997   Edmaier et al. .

OTHER PUBLICATIONS

IEEE Journal On Selected Areas in Communications, vol. 12, No. 1, Jan. 1994, R. Kawamura et al, Self–Healing ATM Networks Based on Virtual Path Concept, pp. 120–127.
Elektrisches Nachrichtenwesen, 4 Quartal 1993, J. Baudron et al, "Verfügbarkeit und Überlebensfähigkeit von SDH-Netzen", pp. 339–348.

Primary Examiner—Chau Nguyen
Attorney, Agent, or Firm—Hill & Simpson

[57] ABSTRACT

Prior art redundancy of a network for information transmission is that individual components such as, for example, lines, switching networks, control computers are doubled. However, this has disadvantages particularly in view of economic feasibility. In order to be able to utilize simple, non-redundantly fashioned components, a redundant logically identical node is used (SN1',SN2',SN3') in addition to each node (SN1,SN2,SN3). Also each trunk (L1,L2,L3) between the nodes is supplemented with a redundant trunk (L1',L2',L3') potentially conducted via a different physical path. Both trunks are linked via at least one combiner/splitter element.

20 Claims, 2 Drawing Sheets

REDUNDANCY-OPTIMIZED COMMUNICATION NETWORK FOR THE TRANSMISSION OF COMMUNICATION SIGNALS

BACKGROUND OF THE INVENTION

The invention is directed to a communication network in which message signals are transmitted, the network having a plurality of interconnected nodes.

The demands that operators and users of networks currently make with respect to quality and dependability in the transmission and switching of information require extremely reliable network components. Particularly lines and nodes, including the respective implemented software, must meet high standards for this reason and are redundantly implemented for dependability reasons.

Individual components are doubly provided in the prior art for establishing the redundancy in the networks. The doubling occurs at the level of the components, such as, for example, the lines, switching networks and control computers. Which of these redundantly implemented components are also involved in the transmission and switching function is decided by a local or central control. The advantage of such an apparatus is that the individual components can be examined individually, and the control of the implementation of the redundancy, especially of the components of the node, can ensue decentrally. Thus, a relatively simple hot standby mode can be implemented.

What is disadvantageous about such an apparatus, however, is that the distributed decision about the use of the redundancy requires a relatively high outlay that is customized for the employment. Since, moreover, the software in redundantly designed equipment is the same, the same software errors can occur in the two apparatuses. A further disadvantage of these structures is that cost-beneficial network node components cannot be utilized therein, since these components (readily available at present) do not have any redundancy. Let what are referred to as CPE components (customer promises equipment) be cited as an example thereof.

SUMMARY OF THE INVENTION

It is an object of the present invention to provide a communication network in which the aforementioned disadvantages are avoided.

It is an advantage of the present invention that a node/mesh redundancy is provided that allows interface-compatible non-redundantly fashioned cost-beneficial nodes together with software to be utilized in a communication network. A high dependability standard is thus achieved. A logically identical node is allocated to each node as the redundancy. Furthermore, each trunk between the nodes is supplemented with a redundant trunk that is potentially conducted via a different physical path. The respective trunk as well as the trunk respectively redundant thereto between the two nodes are linked by combiner/splitter elements. The latter can be potentially implemented separately from the node. The function of the nodes can be that of multiplexers or cross-connectors controlled by a management network. However, they can also be switching equipment ("switches") with call processing.

Advantageous developments of the present invention are as follows.

The combiner/splitter elements are bidirectionally fashioned.

The combiner/splitter elements have a memory that is dimensioned to be such a size that it allows for compensation of the largest possible difference in running time between the two physical paths (including the nodes). This involves the advantage that no cells are lost.

All combiner/splitter elements are linked in a redundancy management system superimposed on the communication network potentially integrated as an independent system in a telecommunication management network.

The combiner/splitter elements are connected to central equipment of the redundancy management network via defined virtual connections of the communication network.

The combiner/splitter elements are respectively connected to central equipment of the redundancy management network via a respective, separate physical line.

Redundancy domains that are respectively limited by the combiner/splitter elements are defined within the communication network.

The combiner/splitter elements are structured such that the redundancy mode is respectively activated by them. Also, an appropriate message signal is supplied for evaluation to the central equipment of the redundancy management network only given disturbances in this redundancy mode.

The combiner/splitter elements are further structured such that the bits for the respective virtual connection are respectively acquired call-associated by them. Particulars with respect to the respective bit rate are supplied to the central equipment of the redundancy management network.

The central redundancy management network is structured such that it generates protocols with respect to the quality of the individual virtual connections based on the criterion of the message signals respectively supplied by the combiner/splitter elements and, potentially, of the bit rate particulars.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
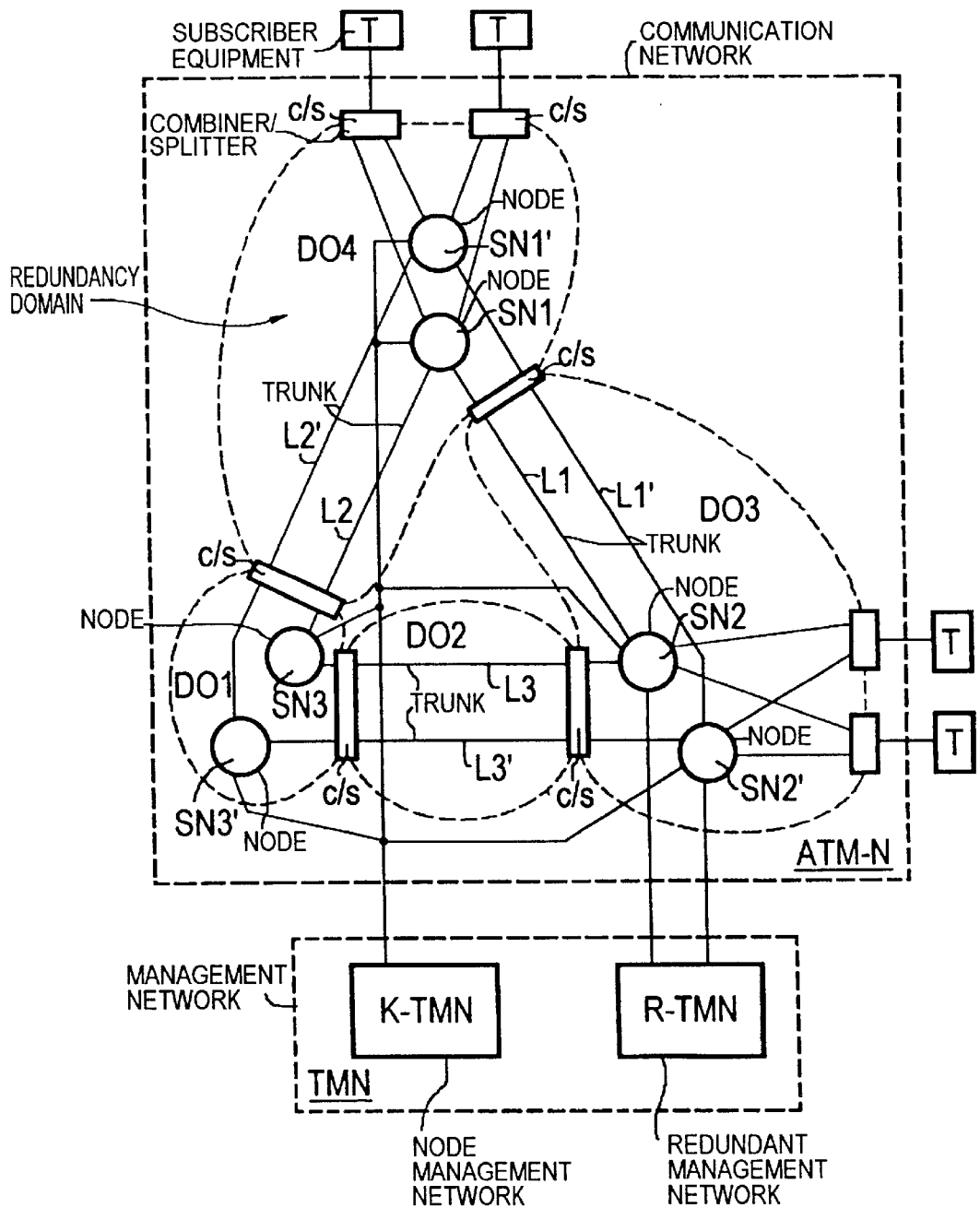
FIG. 1 is a block circuit diagram of portions of a communication network utilizing the present invention.

FIG. 1 shows portions of a communication network ATM-N that is designed for the transmission of message cells according to an asynchronous transfer mode in the present exemplary embodiment. Message cells having a fixed length are transmitted in a known way according to this transfer mode during the course of virtual connections. The message cells respectively have a cell header ("header") as well as an information part. Among other things, particulars with respect to the respective cell header are carried in the cell header. The information part, by contrast, serves for the transmission of the actual useful information. Useful information can thereby be arbitrary digital signals, including, for example, data signals, digital voice information or digital video signals.

The communication network ATM-N has a plurality of nodes connected to one another, only three nodes referenced SN1,SN2,SN3 being indicated in FIG. 1. Let the nodes SN1 and SN2 thereby serve as originating and destination nodes to which subscriber equipment T are respectively connected via subscriber lines.

A plurality of trunks proceeding between the nodes, are represented by a node trunk L1 connecting the nodes SN1 and SN2, a node trunk L2 connecting the nodes SN1 and SN3, as well as a node trunk L3 connecting the nodes SN2 and SN3. Virtual connections proceeding in the same direction are conducted within this communication network. A corresponding call information is respectively carried in the cell header of the respective message cells for identifying such a virtual connection. Let the nodes be fashioned as what are referred to as cross connects or as multiplexers via which virtual paths are permanently established and potentially remain in force for a longer time. The control of these nodes can therefore ensue via a node management network K-TMN that is indicated in FIG. 1 and overlaid on the communication network ATM-N. The nodes, however, can also be composed of switching equipment via which virtual connections or, respectively, paths can be selectively established during the course of a corresponding call setup.

Since a virtual path can, for example, contain up to 65,536 virtual connections and can also have a high aggregate bit rate of, for example, up to 2.4 Gbytes/s, it is expedient to allocate an alternate path on an alternate route to each virtual path in order to be able as needed to switch from a virtual path to the allocated alternate path without a loss of message cells. That is, a redundancy is to be provided in the communication network ATM-N.

According to FIG. 1, the redundancy in the present exemplary embodiment is achieved in that a logically identical node is allocated as redundancy to each of the nodes SN1,Sn2 and SN3.

Corresponding to their allocation, the redundant nodes are referenced SN1',SN2' and SN3'. A logically identical node, such as SN1', is a node that is allocated or associated with node SN1, but is not necessarily physically located at or near node SN1. Like the nodes SN1 and SN2, the nodes SN1' and SN2' are fashioned as originating and destination nodes with subscriber lines leading to subscriber equipment T. Two redundant subscriber lines are thus allocated to each subscriber equipment.

In addition, a redundant node trunk is allocated to each of the node trunks L1,L2 and L3. The node trunk proceeding between the nodes SN1' and SN2' that is redundant with the node trunk L1 is referenced L1', the node trunk proceeding between the nodes SN1'and SN3' that is redundant with the node trunk L2 is referenced L2', and the node trunk proceeding between the nodes SN2' and SN3'that is redundant with the node trunk L3 is referenced L3'.

The redundant node trunks respectively representing a line pair are linked to one another via at least one combiner/splitter element C/S. As an example, the line pair formed of the node trunks L3 and L3' has two such combiner/splitter elements C/S. Let the other line pairs formed of node trunks each respectively have only one combiner/splitter element available.

In addition, the redundant subscriber lines respectively forming a line pair are linked to one another via a combiner/splitter element C/S. At the same time, this forms the interface to an individual subscriber line connected to a subscriber equipment.

Redundancy domains that are respectively limited by combiner/splitter elements are defined in the communication network ATM-N. Four such redundancy domains are referenced DO1 through DO4 in FIG. 1. Such a redundancy domain can have nodes and redundant line pairs (domains DO3 and DO4), only redundant nodes (domain DO1) or only a sub-section of a redundant line pair (domain DO2). The latter derives, for example, from the two combiner/splitter elements C/S that are inserted into the line pair formed of the redundant node trunks L3 and L3'.

In the communication network ATM-N shown in FIG. 1, the message cells output by the subscriber equipment T during the course of virtual connections are redundantly transmitted via the redundant nodes. As shall be explained below, the function of the combiner/splitter elements connected to the node trunks include the selection of an active route on the basis of the message cell streams supplied via the two appertaining node trunks and forwarding only the message cell stream supplied via this over the two redundant node trunks. In the normal case, that of the two node trunks is selected as active path on which the supplied message cell stream appears in leading fashion compared to the remaining node trunk. The combiner/splitter elements connected to the node trunks are bidirectionally fashioned in the present exemplary embodiment.

In a corresponding manner, the function of the combiner/splitter elements that are connected to the subscriber lines and that are likewise bidirectionally designed include selecting only one of the message cell streams supplied via the two, appertaining redundant nodes and forwarding this to the subscriber equipment. A message cell stream output by such a subscriber equipment, by contrast, is redundantly forwarded (using the allocated combiner/splitter element) via the subscriber lines connected thereto.

In the present exemplary embodiment, the combiner/splitter elements C/S are integrated into a redundancy management network R-TMN overlaid on the communication network ATM-N in order to supply information relating to the redundancy to a central equipment belonging thereto. These information shall be explained in greater detail below. This redundancy management network can be integrated as an independent element in a telecommunication management network TMN in addition to the aforementioned node management network K-TMN.

In the present exemplary embodiment, the redundancy management network R-TMN is realized within the communication network ATM-N in that the central equipment is connected to one of the redundant node pairs and is in communication with the individual combiner/splitter elements via defined virtual connections. Alternatively thereto, the connection to the individual combiner/splitter elements can also exist via separate physical lines, that is, the redundancy management network is realized independently of the communication network ATM-N.

Figure 2:
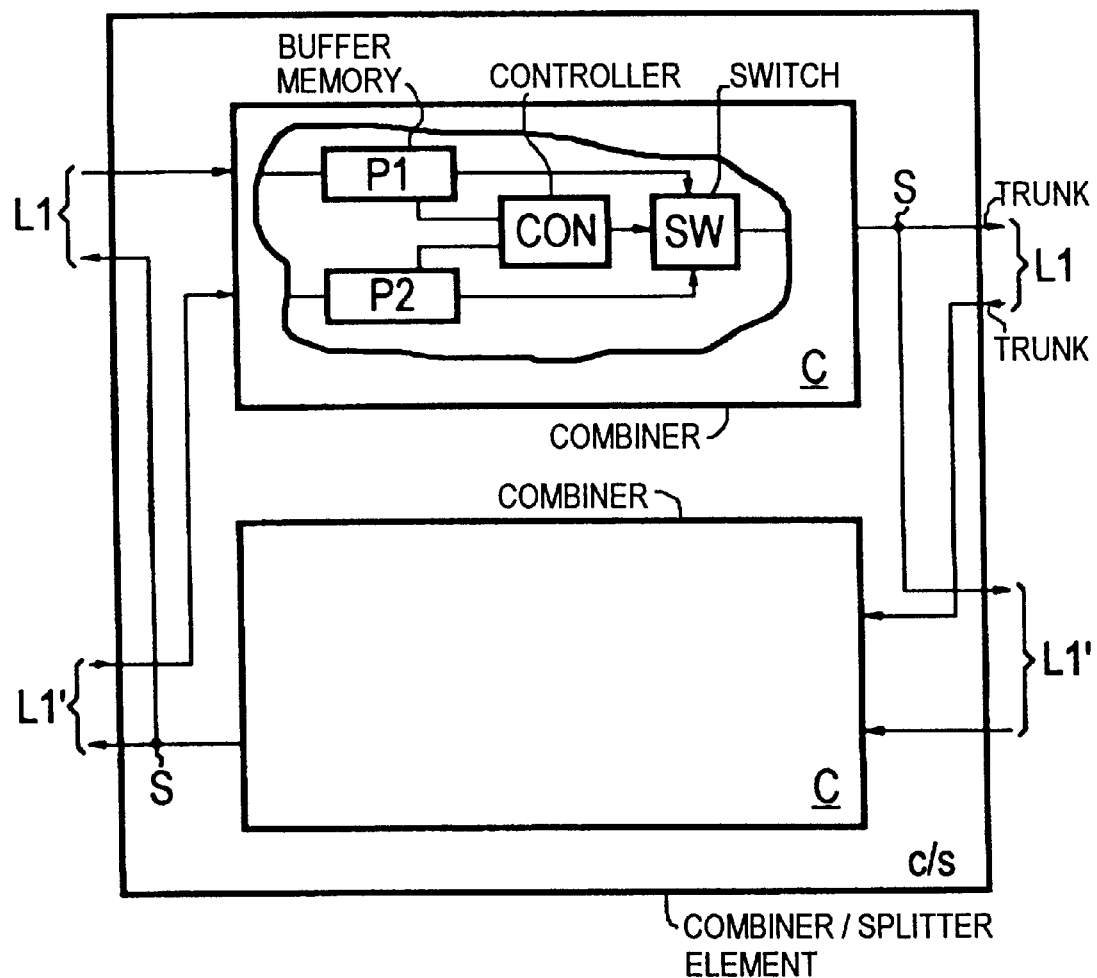
FIG. 2 depicts portions of a possible structure of one of the combiner/splitter elements that are schematically shown in FIG. 1.

The functioning and a possible structure of the aforementioned combiner/splitter elements C/S shall now be discussed in greater detail on the basis of FIG. 2, with reference to the example of the combiner/splitter element linking the node trunks L1 and L1'. Only the circuit elements required for an understanding of the present invention are thereby reproduced in FIG. 2.

According to FIG. 2, the bidirectionally designed combiner/splitter element C/S has two interconnection devices ("combiners") C allocated to the two transmission directions. The input side of each of these combiner elements has two buffer memories P1 and P2, whereby the buffer memory P1 is supplied with the message cell stream appearing on the node trunk L1, whereas the buffer memory P2 is supplied with the message cell stream appearing on the node trunk L1'. These buffer memories are in communication with a control means CON that, on the basis of the message cells accepted into the buffer memories, checks which of the two supplied message cell streams is the leading stream. Via a switch means SW controlled by the control means CON and a distribution point ("splitter") S, this leading message cell stream is then simultaneously forwarded to the continuing node trunks L1 and L1'.

For this check, the control means CON in the present exemplary embodiment compares the messages cells accepted into the buffer memories P1 and P2 on the basis of the cell headers and the remaining informational content to determine whether the message cells appearing on the two node trunks L1 and L1' correlate, that is, a cell comparison for identity is implemented. A correlation length that takes into account the difference in running time caused by the different paths is thereby defined by a corresponding buffer size. A maximum difference in running time of 0.1 ms given, for example, a bit rate of 155 Mbits/s and a message cell length of 53 octets, as defined for ATM cells, would require a buffer size and, thus, a correlation length of 37 message cells.

The cell-by-cell comparison that has just been explained is continuously implemented by the control means CON in order to check which of the two supplied message cell streams is the leading stream and in order to forward in the described way the message cell stream leading at the moment. Given changes in running time that result in a trailing of the previously selected message cell stream, a switch is made to the other node trunk. The switching can therefore ensue loss-free due to the cell-by-cell comparison.

The cell-by-cell comparison and the control events associated therewith that have just been explained are automatically implemented by the control means CON. Only when no correlation between the message cells occurs or, respectively, given outage of the message cell stream on the node trunk previously selected as the active path and a switching to the remaining node trunk connected therewith does the control means CON generate a predetermined message signal. In the present exemplary embodiment, this is inserted into a message cell that is transmitted to the aforementioned central means of the redundancy management network during the course of the aforementioned virtual connection predetermined within the communication network ATM-N for the redundancy management system R-TMN. Moreover, the control means CON identifies the cell rate from the sequence of message cells belonging to the individual virtual connections and informs the central means of the redundancy management network thereof with a predetermined message signal.

Moreover, a table with respect to the virtual connections proceeding via the appertaining node trunks is kept in the control means CON. A previously described, cell-by-cell comparison is only implemented for a message cell when the virtual connection identified by the call particulars in the cell header of the appertaining message cell is already entered in the table. Otherwise, the appertaining message cell is forwarded without comparison, and particulars with respect to the appertaining, previously unregistered virtual connection are entered into the table. Additionally, the central means of the redundancy management network R-TMN is informed about the appearance of a new virtual connection with a corresponding message signal.

The above-explained control events repeat in all combiner/splitter elements C/S allocated to node trunks. In addition, corresponding control events also sequence in combiner/splitter elements allocated to the subscriber lines. The difference is only that, a message cell stream selected by the respective control means CON is supplied via a single subscriber line to the relevant subscriber equipment coming into consideration, and a message cell stream supplied to the respective combiner/splitter element proceeding from the appertaining subscriber equipment is output to the redundant subscriber lines without the above-described evaluation.

The redundancy management network R-TMN in the present exemplary embodiment serves as a higher-ranking management system that, on the basis of the message signals supplied by the combiner/splitter elements C/S, formulates instructions for other management systems of the telecommunication management network TMN, for example for the node management network K-TMN. Such instructions for the node management network can, for example, be that the latter is instructed to implement a change in path when the redundancy for these virtual connections is no longer established via the previous path. Over and above this, the central equipment of the redundancy management network can generate protocols with respect to the quality of individual virtual connections on the basis of the message signals supplied by the individual combiner/splitter elements C/S. These protocols are capable of being made available to the subscribers of the communication network ATM-N (FIG. 1). For example, such a protocol can contain particulars about the redundancy as well as about the error rate for the respective virtual connection.

With respect to the above-described combiner/splitter elements C/S, let it also be pointed out that these can be respectively structured within the communication network ATM-N as a remote unit or as a component part of the redundant nodes. Let it also be pointed out that the present invention was described above with reference to the example of a communication network working according to an asynchronous transfer mode. However, the present invention can also be used in communication networks differing from this transfer mode, for example in packet switching networks.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A communication network for transmission of message signals, the network having a plurality of interconnected nodes, said nodes interconnected by a plurality of trunks, comprising:

a least one combiner/splitter element;

a redundancy within the communication network, the redundancy having a respective logically identical node allocated to each node of the plurality of interconnected nodes;

each trunk of the plurality of trunks being supplemented by a respective redundant trunk that is conducted over a physical path that is different than a physical path of a respective corresponding trunk of the plurality of trunks, the redundant trunks respectively interconnecting the redundant nodes;

the respective corresponding trunk and the respective redundant trunk between two nodes being linked by the at least one combiner/splitter element;

the at least one combiner/splitter element compensating for differences in running times between physical paths of the respective corresponding trunk and the respective redundant trunk including associated nodes therewith.

2. The communication network according to claim 1, wherein the at least one combiner/splitter element is bidirectional.

3. The communication network according to claim 1, wherein the at least one combiner/splitter element has a memory that is dimensioned of such a size that a greatest possible difference in running time is compensated between physical paths of the respective corresponding trunk and the respective redundant trunk including associated nodes therewith.

4. The communication network according to claim 1, wherein all combiner/splitter elements are integrated in a redundancy management system superimposed on the communication network.

5. The communication network according to claim 1, wherein the combiner/splitter elements are connected to central equipment of a redundancy management network via defined virtual connections of the communication network, the redundancy management network thereby controlling the redundancy.

6. The communication network according to claim 1, wherein the combiner/splitter elements are respectively connected to central equipment of a redundancy management network via a respective separate physical line, the redundancy management network thereby controlling the redundancy.

7. The communication network according to claim 1, wherein the communication network has defined redundancy domains that are respectively limited by combiner/splitter elements.

8. The communication network according to claim 1, wherein the combiner/splitter elements are structured such that a redundancy mode is respectively activated by the combiner/splitter elements, and an appropriate message signal is supplied for evaluation to central equipment of the redundancy management network only given disturbances in said redundancy mode.

9. The communication network according to claim 1, wherein the combiner/splitter elements are structured such that bits for a respective virtual connection are respectively acquired call-associated by the combiner/splitter elements and particulars with respect to the respective bit rate are supplied to central equipment of the redundancy management network.

10. The communication network according to claim 1, wherein the network further comprises a central redundancy management network that is structured such that protocols are generated with respect to a quality of individual virtual connections based on a criterion of message signals respectively supplied by combiner/splitter elements.

11. The communication network according to claim 1, wherein said at least one combiner/splitter element is structurally separate from a corresponding node.

12. The communication network according to claim 4, wherein said redundancy management system is part of a telecommunication management network that is connected to the communication network.

13. The communication network according to claim 10, wherein said protocols are generated with respect to bit rate characteristics of the message signals.

14. A communication network for transmission of message signals, the network having a plurality of interconnected nodes, said nodes interconnected by a plurality of trunks, comprising:

at least one combiner/splitter element;

a redundancy within the communication network, the redundancy having a respective logically identical node allocated to each node of the plurality of interconnected nodes;

each trunk of the plurality of trunks being supplemented by a respective redundant trunk that is conducted over a physical path that is different than a physical path of a respective corresponding trunk of the plurality of trunks, the redundant trunks respectively interconnecting the redundant nodes;

the respective corresponding trunk and the respective redundant trunk between two nodes being linked by the at least one combiner/splitter element;

redundancy domains that are respectively defined by respective combiner/splitter elements, a redundancy domain having at least one of redundant nodes, redundant nodes with redundant trunks, and redundant trunks.

15. The communication network according to claim 14, wherein the at least one combiner/splitter element is bidirectional.

16. The communication network according to claim 14, wherein all combiner/splitter elements are integrated in a redundancy management system superimposed on the communication network.

17. The communication network according to claim 14, wherein the combiner/splitter elements are connected to central equipment of redundancy management network via defined virtual connections of the communication network, the redundancy management network thereby controlling the redundancy.

18. A communication network for transmission of message signals, the network having a plurality of interconnected nodes, said nodes interconnected by a plurality of trunks, comprising:

at least one combiner/splitter element;

a redundancy within the communication network, the redundancy having a respective logically identical node allocated to each node of the plurality of interconnected nodes;

each trunk of the plurality of trunks being supplemented by a respective redundant trunk that is conducted over a physical path that is different than a physical path of a respective corresponding trunk of the plurality of trunks, the redundant trunks respectively interconnecting the redundant nodes;

the respective corresponding trunk and the respective redundant trunk between two nodes being linked by the at least one combiner/splitter element;

the at least one combiner/splitter element compensating for differences in running times between physical paths of the respective corresponding trunk and the respective redundant trunk including associated nodes therewith;

redundancy domains that are respectively defined by respective combiner/splitter elements, a redundancy domain having at least one of redundant nodes, redundant nodes with redundant trunks, and redundant trunks.

19. The communication network according to claim 18, wherein the combiner/splitter elements are structured such that a redundancy mode is respectively activated by the combiner/splitter elements, and an appropriate message signal is supplied for evaluation to central equipment of the redundancy management network only given disturbances in said redundancy mode.

20. The communication network according to claim 18, wherein the combiner/splitter elements are structured such that bits for a respective virtual connection are respectively acquired call-associated by the combiner/splitter elements and particulars with respect to the respective bit rate are supplied to central equipment of the redundancy management network.

* * * * *